WILLIAM V. KAY.
Improvement in Check Hooks and Terrets for Harness.
No. 115,061.                                      Patented May 23, 1871.
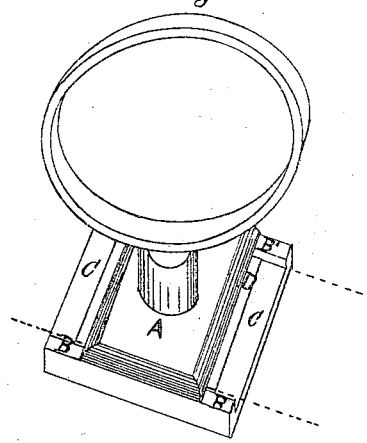
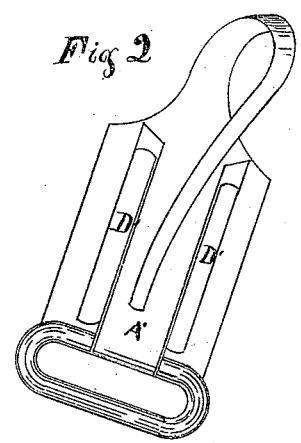

UNITED STATES PATENT OFFICE.

WILLIAM V. KAY, OF CHICAGO, ILLINOIS.

IMPROVEMENT IN CHECK-HOOKS AND TERRETS FOR HARNESS.

Specification forming part of Letters Patent No. 115,061, dated May 23, 1871.

*To all whom it may concern:*

Be it known that I, WILLIAM V. KAY, of Chicago, in the county of Cook and State of Illinois, have invented a new and useful Improvement in Harness Check-Hooks and Terrets; and I do hereby declare the following to be a full, clear, and exact description thereof, which will enable others skilled in the art to which my invention appertains to make and use the same, reference being had to the accompanying drawing forming part of this specification, in which—

Figure 1 is a perspective view of my improved terret, and Fig. 2 is a perspective view of the check-hook.

Similar letters of reference indicate corresponding parts in the several figures of the drawing.

My invention has for its object to provide a harness check-hook and terrets which may be secured to the back-pad of the harness without the use of rivets or screws; and the improvement consists in providing the lower portion of the hook and terrets with bars forming a mortise, through which the pad-strap is drawn, by which the same are firmly secured to the pad.

In the accompanying drawing, A represents the terret, the upper portion of which is made in the usual form. The lower portion of said terret is provided with flanges B B', extending downward, which are connected laterally at the lower side by bars C C', extending across from side to side, thus forming a longitudinal mortise, D, through which the strap covering the pad is drawn, as shown by dotted lines in Fig. 1. Said strap is stitched to the back of the pad upon each side of the terret, by which means said terret is firmly secured. Check-hook A', Fig. 2, is provided with a mortise, D', which is formed in a like manner, through which said strap passes, as described.

The ordinary terret, which is screw-threaded upon its lower end, and engaged with a nut secured upon the inner side of the pad, or by rivets affixed to a metal plate, is more or less liable to become loosened by the turning of the nut or by the working of the rivets, while with my invention this difficulty is entirely overcome, as the bars over which the strap passes are a part of the terret, and must therefore remain firmly affixed.

Having thus described the nature and object of my invention, what I claim as new, and desire to secure by Letters Patent, is—

The harness-terret A and hook A', each cast or made of one and the same piece of metal, and provided with the mortise D having outer bars C C', substantially as and for the purpose described.

The above specification of my invention signed by me this 12th day of December, A. D. 1870.

WM. V. KAY.

Witnesses:
   N. C. GRIDLEY,
   G. H. FROST.